United States Patent Office 3,193,392
Patented July 6, 1965

3,193,392
PACKAGING FROZEN MEAT
Burton R. Lundquist, Highland Park, and Claude J. Wattenbarger, Dolton, Ill., assignors to Swift & Company, Chicago, Ill., a corporation of Illinois
No Drawing. Filed Nov. 20, 1961, Ser. No. 153,698
5 Claims. (Cl. 99—174)

This invention relates to the preservation and packaging of food products and, more particularly, to the production of frozen foods packaged in transparent film.

In the production of frozen foods of the plastic or flaccid type such as meats and the like, the product is subjected to temperatures of around −10 to −30° F. to set the structure of the meat product and guard against deterioration in flavor, color, odor, and quality. Freezing is carried out at low temperatures so as to convert the product from the flaccid, yielding state to a hard, rigid, brittle block or chunk and the freezing step is usually carried out as rapidly as possible. Rapid freezing is considered desirable, particularly in the case of fresh meats since slow freezing tends to cause a darkening of the meat. Since this rapid freezing is often carried out by blasting or blowing cold air over the surface of the product and such procedure usually results in evaporation of moisture from the meat, it has been the practice to carry out the freezing step after the meat has been enclosed in a covering or wrapping material which will inhibit dehydration of the meat and resultant "freezer burn."

Even in those cases where the wrapping or covering material does prevent freezer burn, there is often a loss of the desirable red meat color since many flexible packaging materials which are employed to prevent evaporation of moisture also inhibit the transmission of oxygen. It is important, if the bright red meat color is to be retained, that the meat be in contact with oxygen and/or air during the freezing step, particularly before the product becomes set, to produce a "bloom."

Since good adherence or "cling" of the film and a reasonably high oxygen transmission rate are characteristics of thin films and thin films ordinarily do not provide good protection of the product against damage, in handling, no single film material has been found which possesses all of the desirable properties required. Thus, films which have good flexibility at low temperature and which possess good resistance to tearing, puncturing, and lacerating do not necessarily have good inherent "cling" unless adherence is induced by vacuum or do not have a sufficiently high oxygen transmission rate. Currently packaged frozen products represent a compromise in these characteristics and none has all of the optimum resistance to freezer burn or frosting or resistance to damage during handling.

It is, therefore, an object of this invention to provide an improved method for producing packaged frozen foods whereby the color, quality, and attractiveness of the foods are retained substantially undiminished.

Another object of the invention is to provide a packaged frozen food which is resistant to mechanical damage resulting from handling and which is substantially free of freezer burn, frost, and discoloration.

Still another object of the invention is the provision of a method for packaging meat products to provide a packaged frozen meat having the desirable red meat color yet being substantially free of frost and freezer burn and also having an increased resistance to package damage resulting from handling of the product and contact of the product with other products of the same or similar type.

Additional objects, if not specifically set forth herein, will be readily apparent to those skilled in the art from the detailed description of the invention which follows.

Generally the invention comprises a method for handling foods which are to be marketed in a frozen condition by a series of steps which insures the production of a unitary package containing the product retaining its desirable natural color and being substantially free of freezer burn. Further the packaged product sxhibits a high degree of resistance to package breaking and mechanical damage resulting from handling. In accordance with the method the product, an individual meat cut, for example, such as a steak or a chop, is placed on the surface of a thin flexible film and the edges of the film are lapped over the exposed surfaces of the food product and gently pressed into tight contact with the food product. The wrapped meat product is then frozen and the frozen product is enclosed in an over-wrap of a heavy gauge heat sealable transparent film. The heavy gauge film is heat shrinkable and exposure of the package to heat causes this heavy gauge film to contract around and conform to the shape of the product. The two films combine to provide optimum oxygen transmission and resistance to loss of moisture from the product and superior color retention in the product is realized. Moreover dehydration of the product is held at a minimum and damage to the package resulting from mechanical handling is reduced.

More specifically the method of the invention involves wrapping the meat product in a thin inner wrapping material which permits the passage of oxygen and accordingly insures that meat pigments will be oxidized to the bright red oxyhemoglobin or oxymyoglobin form. The wrapping material should be resistant to the passage of water vapor and protect the meat product against surface dehydration. The type of inner wrap which has been found to provide the desired combination of properties is a thin web or sheet (around ¼–1 mil and preferably about ¼–½ mil) of polyethylene. A film of this thickness is quite resistant to the passage of moisture having a moisture vapor transmission rate of less than ½ gram of water/100 sq. inches/24 hours and passes oxygen at a rate in excess of 100 cc. oxygen/100 sq. inches/24 hours under standard conditions of 73° F. and 50% relative humidity. Because of the thin gauge of the film it is very flexible and exhibits substantial clinging properties. Additionally the thin gauge film possesses little or no insulating properties thus permitting more efficient freezing of the product. It has been found that meat wrapped in intimate contact with the thin gauge flexible film can be frozen rapidly in still air at temperatures around 0° F. whereas much lower temperatures in still air around −20 to −30° F. are required where heavier gauge wrapping materials are employed.

The frozen product having the thin inner wrapper freeze bonded to all surfaces of the meat is then placed in a loose fitting over-wrap such as an envelope or bag of heavy gauge (1.5–5 mil and preferably 2–4 mil) heat sealable film. The heavy gauge polyethylene film is characterized by good mechanical strength and retention of flexibility at low temperatures. Further the heavy gauge film is of the oriented or heat shrinkable type. The envelope is preferably of a size which insures that a layer of air will be maintained between the heavy gauge film and the inner film which adheres to the product. As a result an insulating layer of air is present between the outer film and the frozen product. When the outer film is later exposed to elevated temperatures in order to shrink the film around the product the air space aids in protecting the meat surface against thawing.

Shrinking of the heavy gauge film around the product is carried out by immersing the package in a heated fluid or passing the entire package through a hot air shrink tunnel. A very uniform shrinking of the film is attained and gathering or "puckering" which is characteristic of non-uniform shrinkage is avoided. The smooth finished package is then stored and shipped at freezer temperatures. The package can withstand rough handling without damage because of the three protective layers including the thin inner wrap, a cushioning intermediate air layer and a heavy gauge outer film.

The sequence of steps in forming the package and the combination of wrapping films results in a package which possesses superior insulating properties. Although the inner film need not be of the heat sealable type it is preferred that the outer wrapper be heat sealable so as to permit the formation of a neat closed package.

The following example illustrates the application of the inventive method to the packaging of ground beef, rib roasts, pork chops, sandwiches, fish, pies, etc.

*Example I*

A fresh unfrozen (40° F.), two inch thick blade or flat bone chuck roast cut from U.S. Choice Beef, after being trimmed and scraped clean, was tightly wrapped in a 10 x 20 inch sheet of clear ½ mil thick polyethylene, and placed on a wire rack with the overlapping side down. The rack with the meat on it was placed in a 0° F. dead air freezer and allowed to remain for approximately 8 hours. The frozen meat was removed from the freezer at the end of this time and enclosed in a 4 mil polyethylene envelope which was heat sealed on all four edges. The product was passed through a 400° F. hot air tunnel (15 inches in length), on a wooden linked conveyor traveling at rate of 4 feet per minute. After a cooling period of a few seconds, to permit the outer film to complete the shrinking process, the package was examined. The entire package had the conformation of the original roast. All surfaces of meat except at the perimeter was visible, and the product had a very desirable red color.

While polyethylene fulfills the requirements of the invention very satisfactorily insofar as the characteristics of the film are concerned, other materials in the web or film form may also be manufactured so as to possess the desired oxygen transmission rate, water vapor transmission rate, film, strength, and low temperature flexibility. Such synthetic plastics as polyvinyl chloride, polyvinylidene chloride and copolymers thereof as well as polypropylene and certain polyesters such as heat shrinkable Mylar (polyethylene terephthalate) can be coated or laminated to obtain the desired result.

Other food products which can be handled in a similar manner to provide attractive frozen food packages include in addition to retail size meat cuts such as roasts, steaks, chops and hamburger other foods such as chili, cakes, etc.

Obviously many modifications and variations of the invention as hereinbefore set forth may be made without departing from the spirit and scope thereof and accordingly only those limitations should be imposed as are indicated in the appended claims.

We claim:

1. The method of preserving and packaging flaccid food products comprising: wrapping said flaccid food product in a flexible, heat-sealable, oxygen-permeable synthetic plastic film having a low moisture vapor transmission rate of less than ½ gram of water/100 sq. in./24 hours, adhering the film to all surfaces of the food product, freezing said food product to impart a rigid structure to said product, enveloping said frozen, wrapped product in a heavy gauge second film of about 1.5–5 mil thickness and heat-shrinking said second film around said wrapped, frozen product.

2. A process for preparing frozen food products comprising: wrapping plastic food product in heat-sealable, synthetic plastic flexible film having an oxygen transmission rate in excess of 100 cc. oxygen/100 sq. in./24 hours under standard conditions of 73° F. and 50% relative humidity and a low moisture vapor transmission rate of less than ½ gram of water/100 sq. in./24 hours, adhering said film to all surfaces of said product, freezing said product whereby to freeze-bond said film to said product, enveloping said product and said film in a loose fitting second thick synthetic plastic film, and heat-shrinking said second thick film around said wrapped product while maintaining an air space between said films.

3. A process for preparing frozen food products comprising: freezing meat wrapped in an adherent thin plastic film having an oxygen transmission rate in excess of 100 cc. oxygen/100 sq. in./24 hours under standard conditions of 73° F. and 50% relative humidity to form a frozen meat having the film bonded to the surfaces thereof, wrapping said frozen meat in a second plastic film having a thickness of about 1.5–5 mils and heat-shrinking said second film around said product.

4. A process for preparing packaged frozen meat comprising: adhering a water-vapor-resistant, thin gauge polyethylene film wrapper, which permits passage of oxygen to insure that meat pigments will be oxidized to the oxyhemoglobin and oxymyoglobin forms, to all surfaces of said meat, freezing said meat at a temperature below about 0° F., enclosing the wrapped meat product in a loose fitting heavy gauge shrinkable polyethylene envelope and heat-shrinking said envelope around said meat product.

5. A frozen meat product having an adherent, thin, flexible synthetic plastic film wrapper having an oxygen transmission rate in excess of 100 cc. oxygen/100 sq. in./24 hours under standard conditions of 73° F. and 50% relative humidity and a moisture vapor transmission rate of less than ½ gram of water/100 sq. in/24 hours and overlying said wrapper a thick synthetic plastic film wrapper, the thickness of said thin film being about ¼–1 mil and the thickness of said thick film being about 1.5–5 mils with an insulating layer of air between said thin film and said thick film.

References Cited by the Examiner

UNITED STATES PATENTS 2,779,681   1/57   Sell et al. _____ 99—107
3,061,446   10/62  Norman et al. _____ 99—174

A. LOUIS MONACELL, *Primary Examiner.*

ABRAHAM H. WINKELSTEIN, *Examiner.*